US008792763B2

(12) United States Patent
Bickham et al.

(10) Patent No.: US 8,792,763 B2
(45) Date of Patent: Jul. 29, 2014

(54) BEND RESISTANT MULTIMODE OPTICAL FIBER

(75) Inventors: Scott Robertson Bickham, Corning, NY (US); Dana Craig Bookbinder, Corning, NY (US); Ming-Jun Li, Horseheads, NY (US); Gaozhu Peng, Horseheads, NY (US); Peter Joseph Ronco, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 148 days.

(21) Appl. No.: 13/371,857

(22) Filed: Feb. 13, 2012

(65) Prior Publication Data

US 2012/0230638 A1    Sep. 13, 2012

Related U.S. Application Data (60) Provisional application No. 61/449,763, filed on Mar. 7, 2011.

(51) Int. Cl.
*G02B 6/02* (2006.01)
*G02B 6/036* (2006.01)

(52) U.S. Cl.
CPC .......... *G02B 6/03672* (2013.01); *G02B 6/0365* (2013.01)
USPC ........................................ 385/126

(58) Field of Classification Search
CPC ................. G02B 6/0365; G02B 6/03672
USPC ........................................ 385/126
See application file for complete search history.

(56) References Cited

U.S. PATENT DOCUMENTS

| 7,646,955 | B2 | 1/2010 | Donlagic et al. |
| 8,385,703 | B2 * | 2/2013 | Bennett et al. ................. 385/124 |
| 2008/0056654 | A1 * | 3/2008 | Bickham et al. ............... 385/124 |
| 2008/0166094 | A1 | 7/2008 | Bookbinder et al. |
| 2009/0169163 | A1 | 7/2009 | Abbott, III et al. |
| 2010/0215329 | A1 * | 8/2010 | Bickham et al. ............... 385/123 |
| 2010/0303428 | A1 | 12/2010 | Bickham et al. |
| 2011/0026891 | A1 | 2/2011 | Fini et al. |
| 2012/0230638 | A1 * | 9/2012 | Bickham et al. ............... 385/124 |

FOREIGN PATENT DOCUMENTS

CN    101840023    9/2010

OTHER PUBLICATIONS

TIA SP3-2839-URV2 FOTP-177 IEC-60793-1-43 titled "Measurement Methods and Test Procedures-Numerical Aperture".
IEC 60793-1-20, titled "Measurement Methods and Test Procedures-Fiber Geometry", "Method C: Near—field Light Distribution."
Nelder-Mead algorithm (Nelder, John A. and R. Mead (1965). and R. Mead (1965). "A simplex method for function minimization". *Computer Journal* 7: 308-313).

* cited by examiner

*Primary Examiner* — Charlie Peng
(74) *Attorney, Agent, or Firm* — Robert L Carlson (57) ABSTRACT

Bend resistant multimode optical fibers are disclosed herein. Multimode optical fibers disclosed herein comprise a core region and a cladding region surrounding and directly adjacent to the core region, the cladding region comprising a first region having index delta percent $\Delta_2$, a depressed-index annular portion having $\Delta_3$, and a third annular region surrounding the depressed annular region comprising refractive index delta percent $\Delta_4$; wherein $\Delta_{1MAX} > \Delta_4 > \Delta_2 > \Delta_3$, wherein the difference between $\Delta_4$ and $\Delta_2$ is greater than or equal to 0.03%.

22 Claims, 4 Drawing Sheets

BEND RESISTANT MULTIMODE OPTICAL FIBER

CROSS-REFERENCE TO RELATED APPLICATIONS

This application claims the benefit of priority under 35 U.S.C. §119 of U.S. Provisional Application Ser. No. 61/449,763 filed on Mar. 7, 2011, the content of which is relied upon and incorporated herein by reference in its entirety.

BACKGROUND

The disclosure relates to optical fiber, and more particularly to bend insensitive multimode optical fibers. Bend insensitive multimode fibers are attractive for data center and other applications. To improve the bending characteristics of multimode fibers, designs having a downdoped moat or trench outside of the core have previously been proposed.

SUMMARY

The multimode optical fibers disclosed herein comprise a graded-index core region and a cladding region surrounding the core region. The cladding region comprises a depressed-index annular portion and a region of cladding which has a raised index of refraction compared to a region adjacent to or at the outer boundary of the core region. In some embodiments, the depressed index annular region is immediately adjacent the core, and in other embodiments the depressed index region is spaced from the core Thus, the multimode optical fibers disclosed herein may comprise a central multimode core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$ which is greater than $\Delta_2$ at a radial point less than or equal to 45 microns from the center of the fiber, and wherein $\Delta_{1MAX} > \Delta_4 > \Delta_2 > \Delta_3$, wherein the difference between $\Delta_4$ and $\Delta_2$ is greater than or equal to 0.03%, more preferably greater than or equal to 0.06%.

Alternatively, the multimode optical fibers disclosed herein may comprise a central multimode core region comprising a maximum refractive index delta percent $\Delta_1$, said multimode core region extending to a radial point $R_1$, and a first annular region surrounding said core region comprising refractive index delta percent $\Delta_2$, $\Delta_2$ being the refractive index delta percent measured at the radial location where the derivative $d(\Delta\%/\Delta\% \max)/d(r/R_1)$ is equal to −2.5, $\Delta\%$ max being the maximum core delta and $R_1$ being the core radius estimated by fitting the core index profile to an alpha profile (as described further below). A depressed annular region comprising $\Delta_3$ surrounds said core region and an outer annular region comprising $\Delta_4$ surrounds the depressed annular region, wherein $\Delta_4$ is greater than $\Delta_2$ at a radial point less than or equal to 45 microns from the center of the fiber, $\Delta_{1MAX} > \Delta_4 > \Delta_2 > \Delta_3$, and the difference between $\Delta_4$ and $\Delta_2$ is greater than or equal to 0.06%.

Employing a region in the cladding which has a raised index of refraction compared to a region adjacent to or at the outer boundary of the multimode core region results in a number of advantages. For example, previous designs which utilize a multimode core surrounded by a down doped cladding region may experience increased sensitivity to profile errors at the core/clad interface and elsewhere, the result of which was a negative impact on bandwidth. By employing a raised cladding region, the effects of such profile errors are mitigated. It is also believed that the elevated cladding region helps to strip out leaky and radiation modes that may be trapped as a result of the down doped cladding region. Both of these effects help to result in the achievement of more consistent increased bandwidth in the multimode fiber. It is believed that the enhanced stripping of the leaky modes results in a fiber which exhibits more stable values of optical core diameter and numerical aperture (NA) along the length of the optical fiber. For example, for the fibers disclosed herein, $d(NA)/dL$ typically has the functional dependence $d(NA)/dL = -C_1/L$, where L is the length in meters and $C_1$ is less than 0.003, preferably less than 0.002, more preferably less than 0.001. The derivative of the optical core diameter with respect to length, $d(CD)/dL = -C_2/L$, where CD is measured in μm, L is the length in meters and $C_2$ is less than 0.6, preferably less than 0.4, more preferably less than 0.2.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. For example, the fiber preferably exhibits a 1 turn 10 mm diameter mandrel wrap attenuation increase, of less than or equal to 0.4 dB/turn at 850 nm. In some embodiments, the fiber exhibits an overfilled bandwidth at 850 nm which is greater than 7 GHz/km. In addition, the fiber preferably exhibits a numerical aperture greater than 0.14, more preferably greater than 0.17, even more preferably greater than 0.18, and most preferably greater than or equal to 0.185, and an overfilled bandwidth greater than 1.5 GHz·km at 850 nm. The fiber also preferably exhibits a numerical aperture less than 0.30, more preferably less than 0.24, even more preferably less than 0.22, and most preferably less than or equal to 0.215.

Using the designs disclosed herein, 50 micron diameter core multimode fibers can be made which provide (a) an overfilled (OFL) bandwidth of greater than 1.5 GHz·km, more preferably greater than 2.0 GHz·km, even more preferably greater than 3.0 GHz·km, and most preferably greater than 3.5 GHz·km at a wavelength of 850 nm. These high bandwidths can be achieved while still maintaining a 1 turn 10 mm diameter mandrel wrap attenuation increase at a wavelength of 850 nm, of less than 0.5 dB, more preferably less than 0.3 dB, even more preferably less than 0.2 dB, and most preferably less than 0.15 dB. These high bandwidths can also be achieved while also maintaining a 1 turn 20 mm diameter mandrel wrap attenuation increase at a wavelength of 850 nm, of less than 0.2 dB, more preferably less than 0.1 dB, and most preferably less than 0.05 dB, and a 1 turn 15 mm diameter mandrel wrap attenuation increase at a wavelength of 850 nm, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. The fiber also preferably exhibits a numerical aperture less than 0.30, more preferably less than 0.24, even more preferably less than 0.22, and most preferably less than 0.215. Such fibers are further simultaneously capable of exhibiting an OFL bandwidth at 1300 nm which is greater than 500 MHz·km, more preferably greater than 600 MHz·km, even more preferably greater than 700 MHz·km. Such fibers are further simultaneously capable of exhibiting minimum calculated effective modal bandwidth (Min EMBc) bandwidth of greater than about 1.5 GHz·km, more preferably greater than about 1.8 MHz·km, even more preferably greater than about 2.0 GHz·km at 850 nm, even more preferably greater than about 3.0 GHz·km at 850 nm, and most preferably greater than about 4.0 GHz·km at 850 nm. Using the fiber designs described herein, the relative delays between the modes in the fastest and slowest mode groups can be less than 0.2 ns/km, more preferably less than 0.14 ns/km, even more preferably less than 0.1 ns/km, and most preferably less than 0.06 ns/km. In some preferred embodiments, the relative delays between the modes in the 16$^{th}$ mode group and the fundamental mode are preferably less than 0.2 ns/km, more preferably less than 0.14 ns/km, even more preferably less than 0.1 ns/km, and most preferably less than 0.06 ns/km. In addition, the relative delays between the modes in the 15$^{th}$ mode group and the fundamental mode are preferably less than 0.2 ns/km, more preferably less than 0.14 ns/km, even more preferably less than 0.1 ns/km, and most preferably less than 0.06 ns/km.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture (NA) of the optical fiber is preferably less than 0.23 and greater than 0.17, more preferably greater than 0.18, and most preferably less than or equal to 0.215 and greater than or equal to 0.185.

In some embodiments, the physical core extends radially outwardly from the centerline to a radius R1, wherein 10≤R1≤40 microns, more preferably 20≤R1≤40 microns. In some embodiments, 20≤R1≤34 microns. In some preferred embodiments, the outer radius of the core is between about 20 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than 1.0% and greater than 0.8%.

In some embodiments, the optical fiber exhibits a 1 turn 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Additional features and advantages will be set forth in the detailed description which follows, and in part will be readily apparent to those skilled in the art from that description or recognized by practicing as described herein, including the detailed description which follows, the claims, as well as the appended drawings.

It is to be understood that both the foregoing general description and the following detailed description present embodiments, and are intended to provide an overview or framework for understanding the nature and character of the claims. The accompanying drawings are included to provide a further understanding of the embodiments disclosed herein, and are incorporated into and constitute a part of this specification.

DETAILED DESCRIPTION

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where is the maximum refractive index in region i, unless otherwise specified. The terms $\Delta\%$, delta, delta %, and delta percent are used herein interchangeably and all represent relative refractive index percent. The relative refractive index percent is measured at 850 nm unless otherwise specified. Unless otherwise specified, the reference index, $n_{REF}$ is referred to herein as the average refractive index of the refractive index profile over the outer 88 to 96% of the fiber diameter, i.e. between 55.0 and 60.0 micron radius of a 125 micron diameter fiber. If this annulus is comprised of undoped silica, the refractive index will be 1.4525 at 850 nm, but higher refractive index values may be obtained if the cladding is updoped with respect to the first inner annular region, for example, via doping with chlorine, titanium, phosphorus, germania or an alternative updoping material. The index profile for a given optical fiber can be measured using the refractive near field (RNF) or Mach-Zehnder interferometry measurement techniques.

Macrobend performance was determined according to FOTP-62 (IEC-60793-1-47) by wrapping 1 turn around either a 6 mm, 10 mm, 20 mm or 30 mm diameter mandrel (e.g. "1×10 mm diameter macrobend loss" or the "1×20 mm diameter macrobend loss") and measuring the increase in attenuation due to the bending using an encircled flux (EF) launch condition. The encircled flux was obtained by launching an overfilled pulse into an input end of a 2 m length of InfiniCor® 50 µm optical fiber which was deployed with a 1×25 mm diameter mandrel near the midpoint. The output end of the InfiniCor® 50 µm optical fiber was spliced to the fiber under test, and the measured bend loss is the ratio of the attenuation under the prescribed bend condition to the attenuation without the bend. The overfilled bandwidth was measured according to FOTP-204 using an overfilled launch. Bandwidth was measured at 850 nm, unless otherwise specified. The minimum calculated effective modal bandwidth (Min EMBc) bandwidths were obtained from measured differential mode delay spectra as specified by TIA/EIA-455-220.

As used herein, numerical aperture of the fiber means numerical aperture as measured using the method set forth in TIA SP3-2839-URV2 FOTP-177 IEC-60793-1-43 titled "Measurement Methods and Test Procedures-Numerical Aperture".

The optical core diameter is measured using the technique set forth in IEC 60793-1-20, titled "Measurement Methods and Test Procedures—Fiber Geometry", in particular using the reference test method outlined in Annex C thereof titled "Method C: Near-field Light Distribution." Unless stated otherwise, core diameter or radius as used herein refers to optical core diameter or radius.

The term "α-profile" or "alpha profile" refers to a relative refractive index profile, expressed in terms of $\Delta(r)$ which is in units of "%", where r is radius, which follows the equation, $$\Delta(r)=\Delta(r_o)(1-[|r-r_o|/(r_1-r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

The depressed-index annular portion has a profile volume, $V_3$, given in the units of %·microns² absolute magnitude, defined herein as:

$$2\int_{R_2}^{R_3} \Delta_3(r) r\, dr$$

where $R_2$ is the depressed-index annular portion inner radius and $R_3$ is the depressed-index annular portion outer radius and $R_3$ is measured where the refractive index of the outer portion of region 50 is equal to $\Delta_2$.

The updoped-index annular portion has a profile volume, $V_4$, given in the units of %·microns² absolute magnitude, defined herein as:

$$2\int_{R_3}^{R_{45}} [\Delta_4(r) - \Delta_2] r\, dr$$

where $R_{45}$=45 microns.

Figure 1:
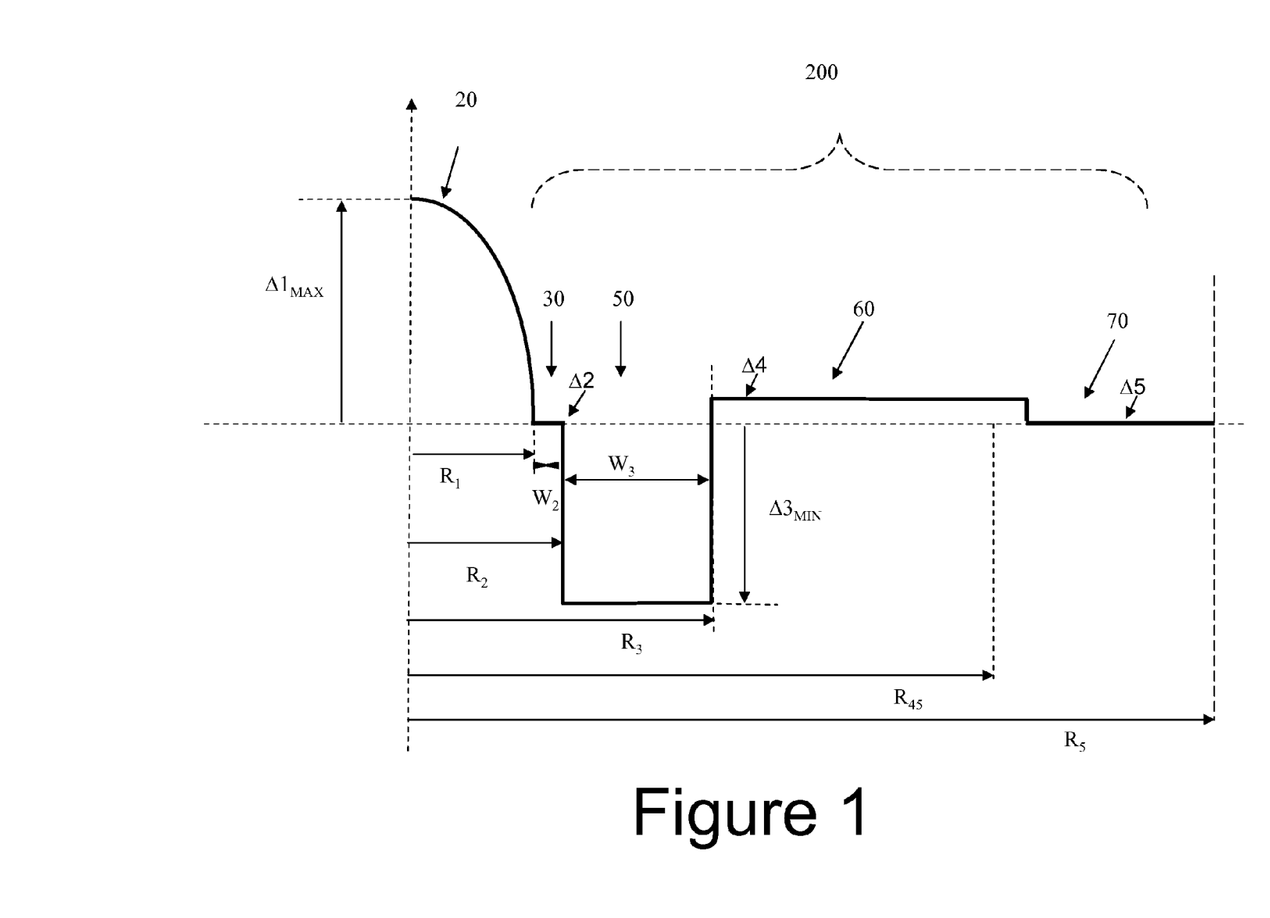
FIG. 1 illustrates an exemplary refractive index profile of one exemplary embodiment of optical fiber.

FIG. 1 shows a schematic representation of the refractive index profile of a cross-section of the glass portion of a first embodiment of a multimode optical fiber, which comprises central glass core region 20 and a glass cladding 200. Preferably, the optical fiber disclosed herein has a silica-based core and cladding. Core region 20 comprises maximum refractive index delta percent $\Delta_1$. The cladding 200 comprises a first inner annular region 30 surrounding core region 20 and comprising refractive index delta percent $\Delta_2$, a depressed-index annular region 50 surrounding inner annular region 30 and comprising $\Delta_3$, and a third annular region 60 surrounding the depressed annular region 50. Third annular region 60 comprises refractive index $\Delta_4$ which is greater than $\Delta_2$ at a radial point less than or equal to 45 microns from the center of the fiber, and wherein $\Delta_{1MAX} > \Delta_4 > \Delta_2 > \Delta_3$. The difference between $\Delta_4$ and $\Delta_2$ is greater than or equal to 0.03%, more preferably greater than or equal to 0.06%. The difference between $\Delta_4$ and $\Delta_2$ is preferably less than or equal to 1%, more preferably less tan or equal to 0.25%, even more preferably less than or equal to 0.1%, and in some embodiments is less than or equal to 0.07%. As shown in FIG. 1, annular region 60 is preferably raised with respect to region 30 from a point beginning at the outside of depressed annular region 50 and continuing at least to a point which is 45 microns from the center of the core ($R_{45}$). The raised index of annular region 60 may extend past the radial point of 45 microns, e.g. region 60 may continue until the outermost radius of the fiber, or alternatively, as shown in FIG. 1, an outer cladding region 70 comprising having $\Delta_5$, which may be higher or lower than $\Delta_4$, may be employed. The refractive index $\Delta_2$ is the relative refractive index at the radius at which the first derivative $d(\Delta/\Delta_{1max})/d(r/R_1)$ is equal to −2.5, $\Delta_{1max}$ being the maximum core delta and a being the core radius estimated by fitting the core index profile to an alpha profile, as described further below.

The fiber core 20 has physical outer radius $R_1$ and maximum refractive index delta $\Delta 1_{MAX}$. The inner annular portion 30 has width $W_2$ and outer radius $R_2$. The refractive index profile of the core has a parabolic (or substantially parabolic) shape; for example, in some embodiments, the refractive index profile of the core has an α-shape with an α value preferably between 1.9 and 2.3, more preferably between about 2.0 and 2.2, as measured at 850 nm. Preferably, the annular portion 30 comprises a width of greater than about 0.5 and less than about 4 microns, more preferably greater than about 0.8 and less than about 3.0 microns, most preferably greater than about 1.0 and less than about 2.0 microns.

Depressed index annular portion 50 has minimum refractive index delta percent $\Delta 3_{MIN}$, width $W_3$ and outer radius $R_3$. The radius $R_2$ is calculated at the inner radius of depressed index annular portion 50 at the point where $\Delta 3_{MIN}/2$ occurs. In FIG. 1, the depressed-index annular portion 50 is shown offset, or spaced away, from the core 20 by the inner annular portion 30. The depressed annular portion 50 surrounds and preferably contacts the inner annular portion 30. The outer annular portion 60 surrounds and preferably contacts the annular portion 50. In some embodiments, the inner annular portion 30 comprises a refractive index delta which is less than that of undoped silica, e.g. via doping inner annular portion 30 with fluorine.

The depressed-index annular portion may, for example, comprise glass comprising a plurality of voids, or glass doped with a downdopant such as fluorine, boron or mixtures thereof, or glass doped with one or more of such downdopants and additionally glass comprising a plurality of voids. For the fibers disclosed herein, the absolute magnitude of $V_3$ is preferably greater than 60%·microns², more preferably greater than 80%·microns², and even more preferably greater than 100%·microns². Preferably the absolute magnitude of $V_3$ is less than 400%·microns², more preferably less than 200%·microns², and even more preferably less than 150%·microns². In some preferred embodiments, the absolute magnitude of $V_3$ is greater than 60%·microns² and less than 200%·microns². In other preferred embodiments, the absolute magnitude of $V_3$ is greater than 80%·microns² and less than 150%·microns². In some embodiments, the depressed index region comprises fluorine, and the core preferably has an outer radius R1 between 22 and 26 microns. The fiber further preferably comprises an inner annular cladding region which comprises a width of greater than 0.5 microns and less than 3 microns, and the inner cladding further preferably comprises a peak fluorine concentration greater than 0.2 wt percent and a peak germania concentration greater than 0.2 wt percent. The depressed index cladding region preferably comprises a depressed-index having a refractive index delta less than about −0.2% and a width of at least 1 micron. In some embodiments, the depressed index cladding region preferably comprises a depressed-index having a refractive index delta less or equal to about −0.3%, and in some embodiment less than or equal to −0.4%. The third annular region 60 surrounds and preferably contacts the depressed annular portion 50, and comprises relative refractive index $\Delta_4$. In some embodiments, the inner annular portion 30 has a substantially constant refractive index profile, as shown in FIG. 1 with a constant $\Delta_2$. The third annular portion 60 may be updoped with respect to the inner annular region, for example, via doping with chlorine, titanium, phosphorus, germania or an alternative updoping material. Alternatively, the inner annular region may be downdoped and the third annular portion 60 may comprise substantially undoped silica, or alternatively the silica in third annular portion 60 may contain an amount of chlorine, fluorine, germania, or other dopants in concentrations that collectively do not significantly modify the refractive index from that of silica. The width of the third annular portion 60 which comprises $\Delta_4$ and is greater than $\Delta_2$ is preferably greater than 10 µm, more preferably greater than 15 µm and even more preferably greater than 20 µm. The outer radius of the third annular portion 60 is preferably greater than 45 µm, more preferably greater than 50 µm and even more preferably greater than 60 µm.

Updoped-index annular portion 60 has refractive index delta percent $\Delta_4$ and a preferably has a width of at least $R_{45}-R_3$, $R_{45}$ being 45 microns. The outer annular portion 60 surrounds and preferably contacts the annular portion 50.

For the fibers disclosed herein, the absolute magnitude of the volume of outer annular portion 60, $V_4$, is preferably greater than 30%·microns², more preferably greater than 50%·microns², and in some embodiments greater than 100%·microns². In some embodiments, the absolute magnitude of $V_4$ is less than 800%·microns², in other embodiments, the absolute magnitude of $V_4$ is less than 400%·microns², and in other embodiments, the absolute magnitude of $V_4$ is less than 200%·microns².

Figure 2:
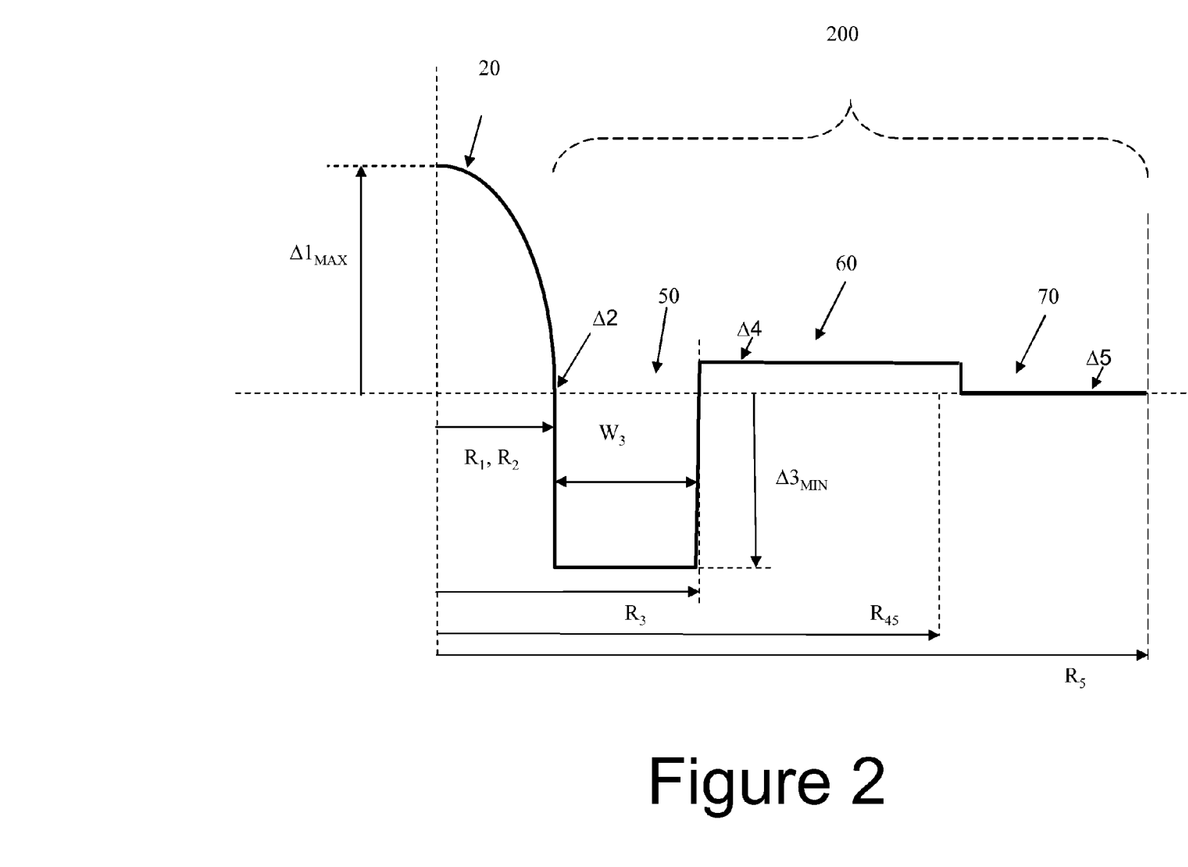
FIG. 2 illustrates an alternative exemplary refractive index profile of one exemplary embodiment of optical fiber.

An alternative embodiment is illustrated in FIG. 2, which again shows a schematic representation of the refractive index profile of a cross-section of the glass portion of a multimode optical fiber. The fiber in this embodiment includes central multimode glass core region 20 and a glass cladding 200. Preferably, the optical fiber disclosed herein has a silica-based core and cladding. Core region 20 comprises maximum refractive index delta percent $\Delta_1$, and the multimode core region extends to a point having refractive index delta percent $\Delta_2$. In FIG. 2, depressed index annular region 50 is immediately adjacent to and surrounds core region 20 and comprises $\Delta_3$. Depressed index annular portion 50 has minimum refractive index delta percent $\Delta_3$, width $W_3$ and outer radius $R_3$. The radius $R_2$ is calculated at the inner radius of depressed index annular portion 50 at the point on the refractive index profile where $\Delta 3_{MIN}/2$ occurs. A third annular region 60 surrounds the depressed annular region 50 and comprises a refractive index delta percent $\Delta_4$ which is greater than $\Delta_2$ at a radial point less than or equal to 45 microns from the center of the fiber, and wherein $\Delta_{1MAX}>\Delta_4>\Delta_2>\Delta_3$, and wherein the difference between $\Delta_4$ and $\Delta_2$ is greater than or equal to 0.03%, more preferably greater than or equal to 0.06%. The difference between $\Delta_4$ and $\Delta_2$ is preferably less than or equal to 1%, more preferably less than or equal to 0.25%, even more preferably less than or equal to 0.1%, and in some embodiments less than or equal to 0.07%. The raised index of annular region 60 may extend past the radial point of 45 microns from the center of the fiber, e.g. region 60, may continue until the outermost radius of the fiber. Alternatively, as shown in FIG. 2, an outer cladding region 70 may be employed which may comprise a delta which is higher or lower than $\Delta_4$.

Both $\Delta_2$ and $\Delta_{2d}$ are measured where the first derivative $d(\Delta/\Delta_{1MAX})/d(r/R_{1est})$ is equal to $-2.5$, $\Delta_{1MAX}$ being the maximum core delta and a being the core radius estimated by fitting the core index profile to an alpha profile. The procedure to fit the core profile to an alpha profile is as follows. Initial estimates of the maximum core delta (e.g. $\Delta_{1MAX}=0.95\%$), the core radius (e.g. $R_{1est}=24$ µm) and the core alpha (e.g. $\alpha_0=2.1$) are used to create a trial function $\Delta_{trial}$ from $r=-R_{1est}$ to $r=+R_{1est}$. The sum of the squares of the difference between the trial function and the measured profile ($\Delta_{meas}$), $\Sigma(\Delta_{trial}-\Delta_{meas})^2$ is minimized over values of r ranging between $0.25R_{1est}$ and $0.95R_{1est}$ using the Nelder-Mead algorithm (Nelder, John A. and R. Mead (1965). "A simplex method for function minimization". *Computer Journal* 7: 308-313). Alternatively, an approximate core radius $R_1$ is identified and a linear fit of function $\ln[1-(\Delta/\Delta_{1MAX})]$ with $\ln(r/R_1)$ is made for values of $R_1$ ranging between $0.25R_{1est}$ and $0.95R_{1est}$. The magnitude of $\Delta_{1MAX}$ is determined by a trial and error procedure such that $R^2$, which is the coefficient of determination of the linear fit, is maximized. The linear fit is then given as:

$$\ln\left[1-\left(\frac{\Delta\%}{\Delta_{1MAX}}\right)\right] = \alpha\ln\left(\frac{r}{R_{1est}}\right) + C \quad [1]$$

where $\alpha$ is the alpha exponent of the core profile and parameter C is used to calculate the physical core radius, $R_1$, as:

$$R_1 = \frac{R_{1est}}{\exp[C/\alpha]} \quad [2]$$

Figure 3:
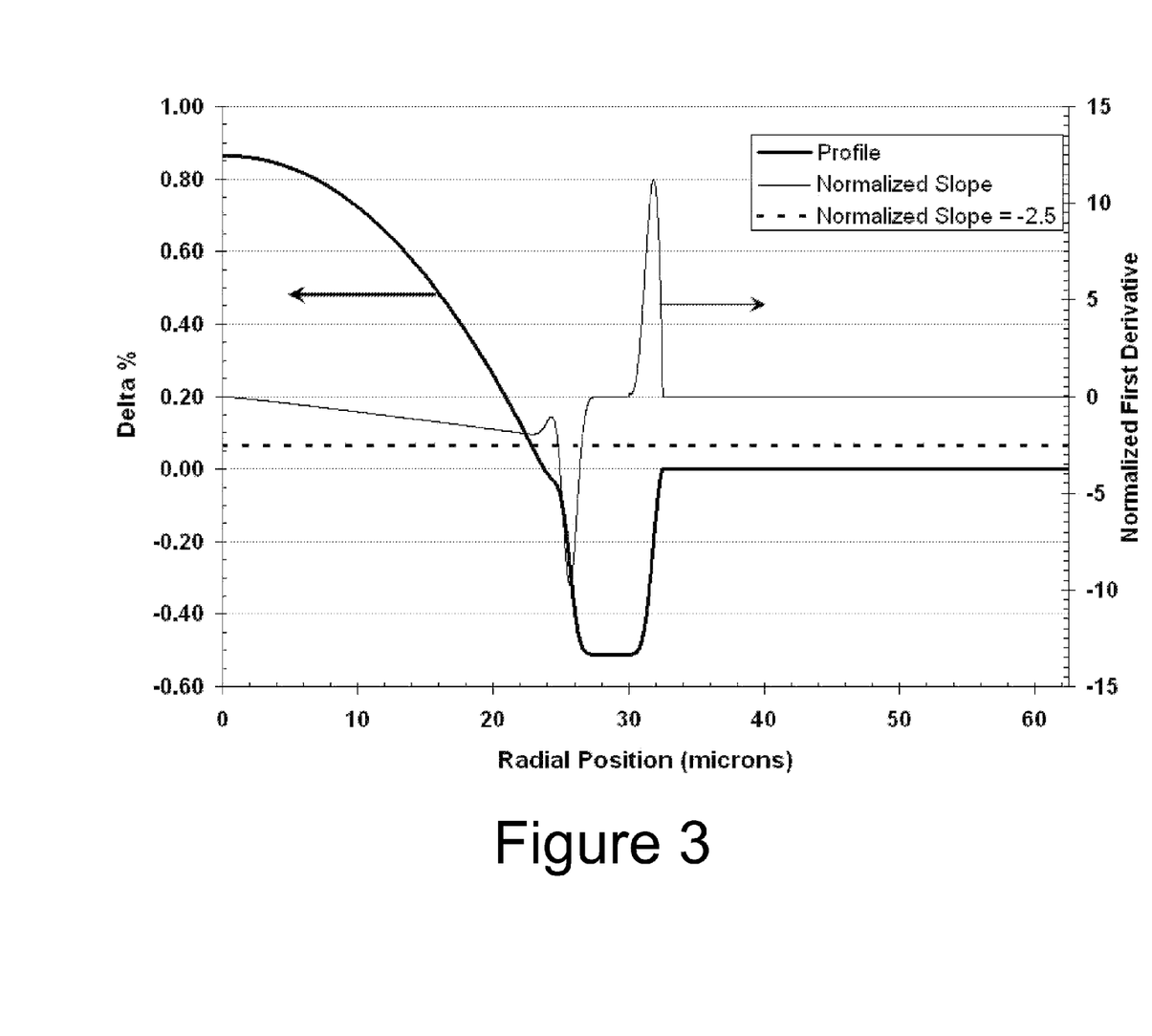
FIG. 3 illustrates the calculation of delta 2 using the derivative on the index of refraction.

The procedure is further illustrated using the following example. FIG. 3 shows an index profile of a multimode fiber for radial positions in fiber ranging from 0 to 30 µm. The profile has a graded index core with an adjacent depressed annular region. To fit the core to an alpha profile, first an approximate core radius, $R_{1est}$, of 24 µm is identified. Using this value of $R_{1est}$, a linear fit between $\ln(1-(\Delta/\Delta_{1MAX}))$ and $\ln(r/R_{1est})$ is made for radial coordinates ranging between 6 and 23 µm, where the profile deviations are minimum from an alpha profile and the radial range over which the profile can be fitted to a alpha profile. It is determined that the $R^2$ of the linear fit is maximized for $\Delta_{1MAX}$ of 0.864% (FIG. 2), with the linear fit parameters of slope $\alpha=2.0972$ and y-intercept $C=-0.021088$. These are then used to calculate the actual core radius using Eq. [2], with the actual core radius $R_1$ estimated to be 24.24 µm. The maximum core delta, $\Delta_{1MAX}$, and core radius, $R_1$, are used to estimate the first derivative $d(\Delta/\Delta_{1MAX})/d(r/R_1)$ (shown in FIG. 3), which has a magnitude of $-2.5$ at radial location of 24.78 µm at which the $\Delta_2=-0.051\%$ The fiber core 20 has outer radius $R_1$ and maximum refractive index delta $\Delta_{1MAX}$. The refractive index profile of the core has a parabolic (or substantially parabolic) shape; for example, in some embodiments, the refractive index profile of the core has an $\alpha$-shape with an $\alpha$ value preferably between 1.9 and 2.3, more preferably between about 2.0 and 2.2, as measured at 850 nm.

Depressed-index annular portion 50 has minimum refractive index delta percent $\Delta 3_{MIN}$, width $W_3$ and outer radius $R_3$. In FIG. 2, the depressed annular portion 50 surrounds and preferably contacts the fiber core 20. The outer annular portion 60 surrounds and preferably contacts the annular portion 50.

The depressed-index annular portion may, for example, comprise glass comprising a plurality of voids, or glass doped with a downdopant such as fluorine, boron or mixtures thereof; or glass doped with one or more of such downdopants and additionally glass comprising a plurality of voids. For the fibers disclosed herein, the absolute magnitude of $V_3$ is preferably greater than 60%·microns², more preferably greater than 80%·microns², and even more preferably greater than 100%·microns². Preferably the absolute magnitude of $V_3$ is less than 400%·microns², more preferably less than 200%·microns², and even more preferably less than 150%·microns². In some preferred embodiments, the absolute magnitude of $V_3$ is greater than 60%·microns² and less than 200%·microns². In other preferred embodiments, the absolute magnitude of $V_3$ is greater than 80%·microns² and less than 150%·microns². In some embodiments, the depressed index region comprises fluorine, and the core preferably has a physical outer radius R1 between 23 and 26 microns. The depressed index cladding region preferably may comprise a depressed-index having a refractive index delta less than about −0.2% and a width of at least 1 micron.

Annular region 60 surrounds and preferably contacts the depressed annular portion 50, and comprises a minimum refractive index delta percent $\Delta_{4min}$ and a maximum relative refractive index $\Delta_{4max}$. Annular portion 60 may be updoped with respect to the inner annular region, for example, via doping with chlorine or germania or an alternative updoping material, including $Al_2O_3$, $P_2O_5$, $TiO_2$ or combinations thereof. In some embodiments, annular region 60 comprises substantially undoped silica, although the silica may contain some amount of chlorine, fluorine, germania, or other dopants in concentrations that collectively do not significantly modify the refractive index. The width of the third annular portion 60 is preferably greater than 10 microns, more preferably greater than 15 microns and even more preferably greater than 20 microns. The outer radius of the third annular portion 60 is preferably greater than 45 microns, more preferably greater than 50 microns and even more preferably greater than 60 microns.

For the fibers disclosed herein, the absolute magnitude of the volume of outer annular portion 60, $V_4$, is preferably greater than 30%·microns², more preferably greater than 50% microns², and in some embodiments greater than 100%·microns². In some embodiments, the absolute magnitude of $V_4$ is less than 800%·microns², in other embodiments, the absolute magnitude of $V_4$ is less than 400%·microns², and in other embodiments, the absolute magnitude of $V_4$ is less than 200%·microns².

Example 1

A fiber with a maximum core delta of 0.936% and a core alpha of 2.12 was made using $GeO_2$ doped $SiO_2$. The radius of core region 20 was about 24.2 microns and first inner annular region 30 was comprised of silica which was essentially free of germania and fluorine, and had a width of about 1.5 microns. A depressed-index annular region 50 (made using fluorine doped silica) surrounded inner annular region 30 and comprising $\Delta_3$ of about −0.45%. Depressed-index annular region 50 started at 25.7 microns and extended to about 31 microns. Multiple core cane preforms were made which would, when drawn into an optical fiber, result in the above parameters of core region 20, inner annular region 30, and depressed annular region 50. Some of these core cane preforms were overclad with silica which was essentially free of germania and fluorine (i.e., having $\Delta_4$ of about zero), while other identical core cane preforms were overclad with a layer doped with chlorine such that the overclad updoped index ($\Delta_4$) was about +0.05% compared to $\Delta_2$ as well as undoped silica. Both optical preforms made in such a fashion were drawn at 10 m/s at different draw tensions to 125 μm fiber diameter. The volume $V_3$ of the depressed-index annular region in these fibers was about 135%·microns². The volume of the updoped region, $V_4$ from 31 microns to 45 microns radially in the updoped fibers was about 53%·microns². The measured optical core diameters and OFL bandwidths at 850 and 1300 nm are listed in Table 1.

TABLE 1

| | Non-Updoped Overclad Preform | | | | Updoped Overclad Preform | | |
|---|---|---|---|---|---|---|---|
| Draw tension (g) | OFL BW at 850 nm (MHz · km) | OFL BW at 1300 nm (MHz · km) | Optical CD (microns) | Draw tension (g) | OFL BW at 850 nm (MHz · km) | OFL BW at 1300 nm (MHz · km) | Optical CD (microns) |
| 35 | 1883 | 754 | | 50 | 5871 | 620 | 50.69 |
| 55 | 2296 | 729 | | 70 | 4998 | 584 | 50.55 |
| 75 | 2533 | 697 | 51.03 | 90 | 2908 | 539 | 51.01 |
| 95 | 3641 | 638 | 51.64 | 115 | 2679 | 562 | 51.22 |
| 115 | 4686 | 569 | 50.88 | 135 | 2092 | 530 | |
| 135 | 3274 | 506 | 50.45 | 155 | 1379 | 458 | |
| 155 | 2826 | 494 | 50.37 | 175 | 1043 | 416 | |
| 175 | 2775 | 478 | | 195 | 1023 | 417 | |
| 195 | 2141 | 447 | | | | | |

Figure 4:
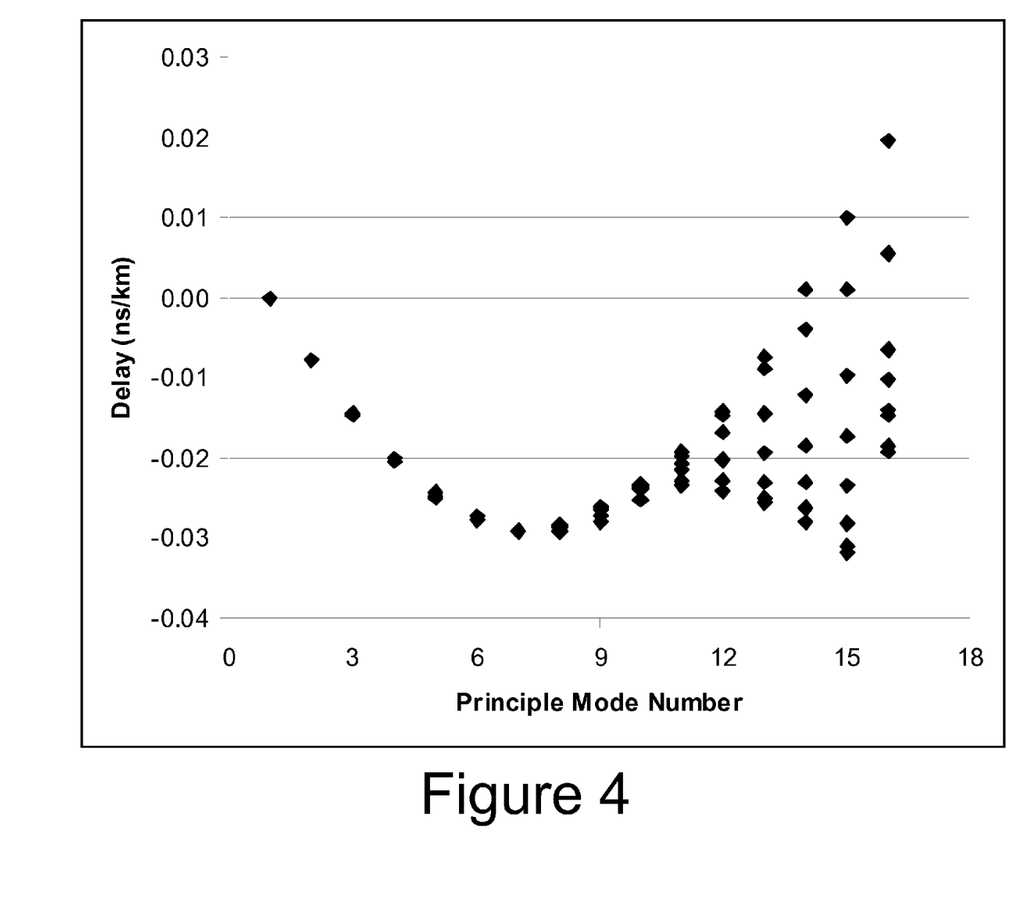
FIG. 4 illustrates the modeled delays of the modes of Example 2.

Table 2 below provides modeled profile parameters for 7 exemplary embodiments (examples 2-8) in which the inner cladding is down-doped with respect to the core, for example by incorporating fluorine into the silica material. All of these examples have the general refractive index profile of the fiber shown in FIG. 1. Set forth in Table 2 for each example are delta, alpha, and radius of the core region, refractive index delta and width of inner annular region, refractive index delta and inside and outside radius of the depressed annular region (moat). These modeled examples all have optical core diameters between 47.5 and 52.5 microns, numerical apertures between 0.185 and 0.215, and overfilled bandwidths at 850 nm greater than 10 GHz·km. The modelled group delays of Example 2 are plotted in FIG. 4, illustrating that the relative delays between the fastest and slowest modes in the 16 mode groups are less than 0.06 ns/km.

TABLE 2

| Parameter | Example 2 | Example 3 | Example 4 | Example 5 | Example 6 | Example 7 | Example 8 |
|---|---|---|---|---|---|---|---|
| Delta1max % | 0.892 | 0.887 | 0.891 | 0.901 | 0.912 | 0.951 | 0.937 |
| R1 (microns) | 23.03 | 23.18 | 23.10 | 23.48 | 23.11 | 23.64 | 23.57 |
| Alpha | 2.100 | 2.100 | 2.100 | 2.100 | 2.100 | 2.100 | 2.100 |
| R2d (microns) | 24.29 | 24.56 | 24.47 | 24.90 | 24.58 | 24.75 | 24.73 |
| Delta2% | −0.059 | −0.073 | −0.081 | −0.062 | −0.096 | −0.057 | −0.057 |
| R2 (microns) | 24.92 | 25.23 | 25.24 | 25.45 | 25.31 | 25.38 | 25.39 |
| W2 (microns) | 1.89 | 2.05 | 2.14 | 1.97 | 2.20 | 1.74 | 1.82 |
| Delta3% | −0.47 | −0.47 | −0.47 | −0.47 | −0.47 | −0.40 | −0.43 |

TABLE 2-continued

| Parameter | Example 2 | Example 3 | Example 4 | Example 5 | Example 6 | Example 7 | Example 8 |
|---|---|---|---|---|---|---|---|
| R3 (microns) | 31.16 | 31.41 | 31.38 | 31.45 | 31.33 | 30.81 | 30.84 |
| V3 (% · microns$^2$) | 152 | 152 | 150 | 147 | 148 | 112 | 121 |
| Delta4% | 0 | 0 | 0 | 0 | 0 | 0 | 0 |
| V4 (% · microns$^2$) | 61.9 | 76.1 | 84.5 | 64.4 | 100.1 | 60.8 | 60.9 |
| Delta5% | 0 | 0 | 0 | 0 | 0 | 0 | 0 |
| R5 (microns) | 62.5 | 62.5 | 62.5 | 62.5 | 62.5 | 62.5 | 62.5 |
| Core Diameter (microns) | 49.8 | 50.5 | 50.5 | 50.9 | 50.6 | 50.8 | 50.8 |
| Numerical Aperture | 0.202 | 0.201 | 0.202 | 0.203 | 0.204 | 0.208 | 0.207 |
| Modeled OFL BW at 850 nm (MHz · km) | 15549 | 15711 | 15493 | 12351 | 12325 | 13103 | 12922 |

The measured refractive index profile parameters and optical attributes of two exemplary fibers, Examples 9 and 10, are given in Table 3. The relative refractive index of Example 9 is presented in FIG. 5. The first annular region in these fibers is doped with fluorine to reduce the refractive index with respect to the outer cladding, which is substantially pure silica. The magnitude of the relative refractive indices of the first annular regions 30 of these fibers are both greater than 0.03%. The overfilled bandwidths at 850 nm are greater than 2500 MHz·km, the optical core diameters are between 47.5 and 52.5 microns, and the numerical apertures are less than 0.215.

TABLE 3

| Parameter | Example 9 | Example 10 |
|---|---|---|
| Delta1max % | 0.888 | 0.951 |
| R1 (microns) | 22.82 | 22.66 |
| Alpha | 2.162 | 2.148 |
| R2d (microns) | 24.31 | 24.00 |
| Delta2 % | −0.11 | −0.08 |
| R2 (microns) | 24.85 | 24.66 |
| W2 (microns) | 2.03 | 2.00 |
| Delta3 % | −0.48 | −0.41 |
| R3 (microns) | 31.03 | 30.74 |
| V3 (% · microns$^2$) | 154 | 127 |
| Delta4 % | 0 | 0 |
| V4 (% · microns$^2$) | 119 | 85.3 |
| Delta5 % | 0 | 0 |
| R5 (microns) | 62.5 | 62.5 |
| Measured OFL BW at 850 nm (MHz · km) | 3133 | 2678 |
| Measured OFL BW at 1300 nm (MHz · km) | 536 | 520 |
| Optical Core Diameter (microns) | 50.13 | 49.20 |
| Numerical Aperture | 0.212 | 0.213 |

Table 4 gives the measured refractive index profile parameters and optical attributes of two exemplary fibers in which the outer annular region is doped with chlorine to increase the refractive index with respect to the first annular region. In these exemplary fibers, the magnitude of the refractive indices of the first annular regions 30 with respect to the outermost cladding are greater than 0.03%. The optical core diameters are between 47.5 and 52.5 microns, and the numerical apertures are greater than 0.185 and less than 0.215.

TABLE 4

| Parameter | Example 11 | Example 12 |
|---|---|---|
| Delta1max % | 0.905 | 0.887 |
| R1 (microns) | 22.41 | 22.68 |
| Alpha | 2.14 | 2.15 |
| R2d (microns) | 24.27 | 23.86 |
| Delta2 % | −0.065 | −0.050 |
| R2 (microns) | 24.96 | 24.66 |
| W2 (microns) | 2.55 | 1.98 |
| Delta3 % | −0.467 | −0.47 |
| R3 (microns) | 31.43 | 31.25 |
| V3 (% · microns$^2$) | 158 | 160 |
| Delta4 % | 0 | 0 |
| V4 (% · microns$^2$) | 67.4 | 52.4 |
| Delta5 % | 0 | 0 |
| R5 (microns) | 62.5 | 62.5 |
| Optical Core Diameter (microns) | 49.9 | 49.3 |
| Numerical Aperture | 0.203 | 0.201 |

Table 5 gives the measured refractive index profile parameters and optical attributes of four exemplary fibers in which the outer annular region is doped with titania to increase the refractive index with respect to the first annular region. In these exemplary fibers, the magnitude of the refractive indices of the first annular regions 30 with respect to the outer cladding are greater than 0.07%. The optical core diameters are between 47.5 and 52.5 microns, and the numerical apertures are greater than 0.185 and less than 0.215.

TABLE 5

| Parameter | Example 13 | Example 14 | Example 15 | Example 16 |
|---|---|---|---|---|
| Tension (g) | 136 | 155 | 182 | 218 |
| Delta1max % | 0.796 | 0.808 | 0.837 | 0.853 |
| R1 (microns) | 22.02 | 21.97 | 22.14 | 22.24 |
| Alpha | 2.234 | 2.148 | 2.067 | 2.211 |
| R2d (microns) | 23.93 | 23.89 | 23.68 | 23.97 |
| Delta2 % | −0.121 | −0.112 | −0.074 | −0.119 |
| R2 (microns) | 24.76 | 24.71 | 24.70 | 24.76 |
| W2 (microns) | 2.74 | 2.74 | 2.56 | 2.52 |
| R3 (microns) | 31.06 | 31.00 | 31.01 | 31.09 |
| Delta3 % | −0.55 | −0.546 | −0.528 | −0.497 |
| V3 (% · microns$^2$) | 179 | 177 | 171 | 162 |
| Delta4 % | 0.051 | 0.05 | 0.056 | 0.065 |
| V4 (% · microns$^2$) | 87.5 | 87.44 | 90.81 | 94.72 |
| Delta5 % | 0 | 0 | 0 | 0 |
| R5 (microns) | 62.5 | 62.5 | 62.5 | 62.5 |
| Optical Core Diameter (microns) | 50.9 | 50.9 | 50.9 | 51.0 |
| Numerical Aperture | 0.213 | 0.213 | 0.209 | 0.199 |

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A multimode optical fiber comprising:
   a central multimode core region comprising maximum refractive index delta percent $\Delta_1$, and a radius $R_1$;
   a cladding comprising an outer radius $R_{clad}$, the cladding comprising
   (a) a first inner annular region surrounding said core region and comprising refractive index delta percent $\Delta_2$, and a radius $R_2$, wherein $R_2 > R_1$;
   (b) a depressed-index annular region surrounding said inner annular region and comprising $\Delta_3$ and a radius $R_3$, wherein $R_3 > R_2$;
   (c) a third annular region comprising refractive index delta percent $\Delta_4$ which is greater than $\Delta_2$ at a radial point less than or equal to 45 microns from the center of the fiber, the third annular region surrounding the depressed annular region; wherein $\Delta_{1MAX} > \Delta_4 > \Delta_2 > \Delta_3$, the third annular region being the outermost cladding region with an outer a radius $R_4$, wherein $R_4 = R_{clad}$; and
   wherein the difference between $\Delta_4$ and $\Delta_2$ is greater than or equal to 0.03 delta percent.

2. The fiber of claim 1, wherein the difference between $\Delta_4$ and $\Delta_2$ is greater than or equal to 0.06.

3. The fiber of claim 1, wherein said fiber further exhibits an overfilled bandwidth greater than 1.5 GHz·km at 850 nm.

4. The fiber of claim 3, wherein said fiber further exhibits a 1 turn 10 mm diameter mandrel wrap attenuation increase of less than or equal to 0.5 dB/turn at 850 nm.

5. The fiber of claim 1, wherein said fiber further exhibits a 1 turn 10 mm diameter mandrel wrap attenuation increase, of less than or equal to 0.2 dB/turn at 850 nm.

6. The fiber of claim 1, wherein said inner annular region comprises fluorine, boron, or mixtures thereof.

7. The fiber of claim 2, wherein said depressed-index annular portion has a width greater than 2 microns.

8. The fiber of claim 7, wherein said third annular region comprises a dopant selected from the group consisting of chlorine, $GeO_2$, $Al_2O_3$, $TiO_2$, $P_2O_5$, or mixtures thereof.

9. The fiber of claim 1, wherein said fiber further exhibits an overfilled bandwidth greater than 2.0 GHz·km at 850 nm.

10. The fiber of claim 1, wherein said fiber further exhibits an overfilled bandwidth greater than 3.5 GHz·km at 850 nm.

11. A multimode optical fiber comprising:
    a central multimode core region comprising a maximum refractive index delta percent $\Delta_1$, said multimode core region extending to a radial point $R_1$; and
    a cladding comprising an outer most radius $R_{clad}$ and
    (a) a first inner annular region surrounding said core having a refractive index delta percent $\Delta_2$, and a radius $R_2$, wherein $R_2 > R_1$ having refractive index, $\Delta_2$ being the refractive index delta percent measured at the radial location where the first derivative $d(\Delta\%/\Delta\% \max)/d(r/R_1)$ is equal to $-2.5$, $\Delta\%$ max being the maximum core delta and $R_1$ being the core radius estimated by fitting the core index profile to an alpha profile,
    (b) a depressed-index annular region surrounding said core region comprising $\Delta_3$, and a radius $R_3$, wherein $R_3 > R_2$;
    (c) an outermost cladding annular region directly adjacent to and surrounding the depressed annular region comprising refractive index delta percent $\Delta_4$ which is greater than $\Delta_2$ and an radius $R_4$, wherein $R_4 = R_{clad}$; wherein $\Delta_{1MAX} > \Delta_4 > \Delta_2 > \Delta_3$, wherein the difference between $\Delta_4$ and $\Delta_2$ is greater than or equal to 0.03 delta percent.

12. The fiber of claim 11, wherein the difference between $\Delta_{4min}$ and $\Delta_2$ is greater than or equal to 0.06 delta percent.

13. The fiber of claim 11, wherein said fiber further exhibits an overfilled bandwidth greater than 1.5 GHz·km at 850 nm.

14. The fiber of claim 13, wherein said fiber further exhibits a 1 turn 10 mm diameter mandrel wrap attenuation increase of less than or equal to 0.5 dB/turn at 850 nm.

15. The fiber of claim 1, wherein said fiber further exhibits a 1 turn 10 mm diameter mandrel wrap attenuation increase, of less than or equal to 0.2 dB/turn at 850 nm.

16. The fiber of claim 2, wherein said depressed-index annular portion has a width greater than 2 microns.

17. The fiber of claim 7, wherein said depressed-index annular portion has a width less than 10 microns.

18. The fiber of claim 1, wherein said fiber further exhibits an overfilled bandwidth greater than 2.0 GHz·km at 850 nm.

19. The fiber of claim 1, wherein said fiber further exhibits an overfilled bandwidth greater than 3.5 GHz·km at 850 nm.

20. The fiber of claim 1, wherein said fiber further exhibits an overfilled bandwidth greater than 7.0 GHz·km at 850 nm.

21. A multimode optical fiber comprising:
    a central multimode core region comprising maximum refractive index delta percent $\Delta_1$, a first inner annular region surrounding said core comprising refractive index delta percent $\Delta_2$, a depressed-index annular region surrounding said inner annular region and comprising $\Delta_3$ and a third annular region comprising refractive index delta percent $\Delta_4$ which is greater than $\Delta_2$ at a radial point less than or equal to 45 microns from the center of the fiber, the third annular region surrounding the depressed-index annular region and being the outermost cladding region wherein $\Delta_{1MAX} > \Delta_4 > \Delta_2 > \Delta_3$, wherein the difference between $\Delta_4$ and $\Delta_2$ is greater than or equal to 0.03 delta percent and is less than or equal to 0.07 delta percent.

22. A multimode optical fiber comprising:
    a central multimode core region comprising a maximum refractive index delta percent $\Delta_1$, said multimode core region extending to a radial point $R_1$ having refractive index delta percent $\Delta_2$, $\Delta_2$ being the refractive index delta percent measured at the radial location where the first derivative $d(\Delta\%/\Delta\% \max)/d(r/R_1)$ is equal to $-2.5$, $\Delta\%$ max being the maximum core delta and $R_1$ being the core radius estimated by fitting the core index profile to an alpha profile, a depressed-index annular region surrounding said core region comprising $\Delta_3$, and an outermost annular cladding region surrounding the depressed-index annular region comprising refractive index delta percent $\Delta_4$ which is greater than $\Delta_2$ at a radial point less than or equal to 45 microns from the center of the fiber; wherein $\Delta_{1MAX} > \Delta_4 > \Delta_2 > \Delta_3$, wherein the difference between $\Delta_4$ and $\Delta_2$ is greater than or equal to 0.03 delta percent and is less than or equal to 0.07 delta percent.

* * * * *